(No Model.)  3 Sheets—Sheet 1.
O. E. OLSEN.
BAND CUTTER AND FEEDER.
No. 553,257.  Patented Jan. 21, 1896.
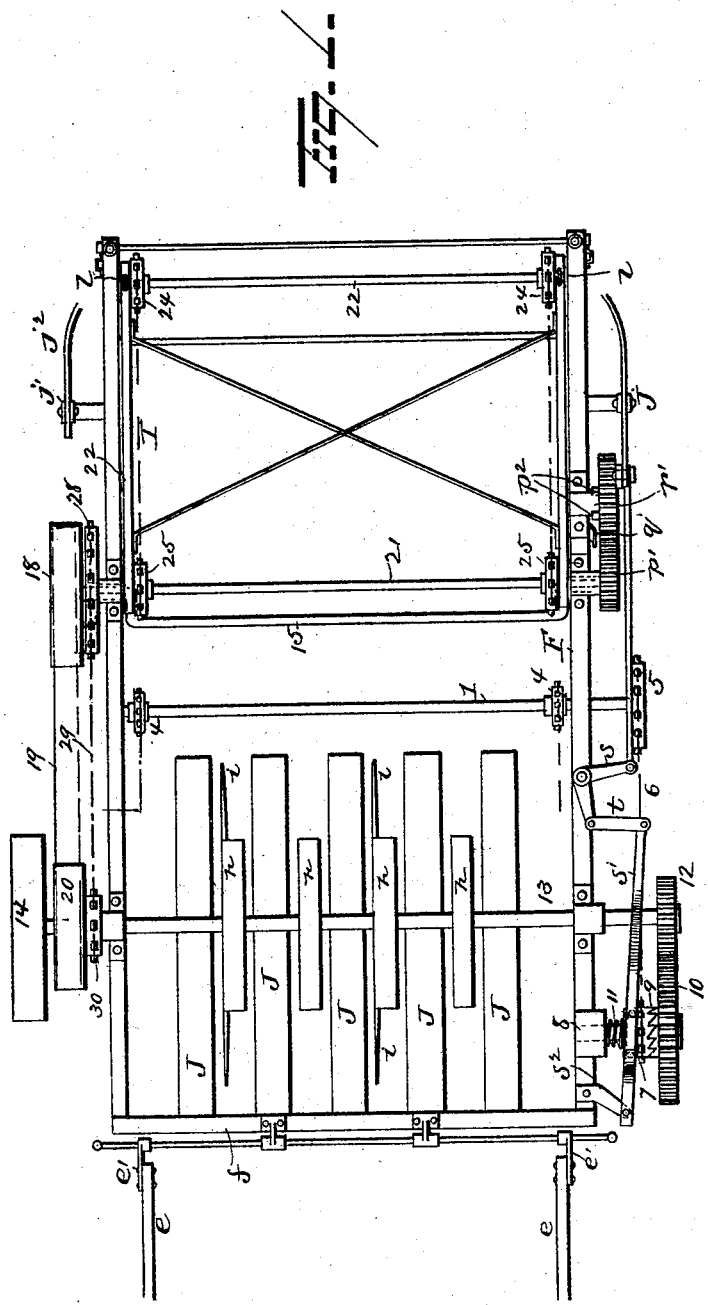
Witnesses
E. J. Nottingham
G. F. Downing
Inventor
O. E. Olsen
By H. A. Seymour
Attorney (No Model.) 3 Sheets—Sheet 2.
O. E. OLSEN.
BAND CUTTER AND FEEDER.
No. 553,257. Patented Jan. 21, 1896.
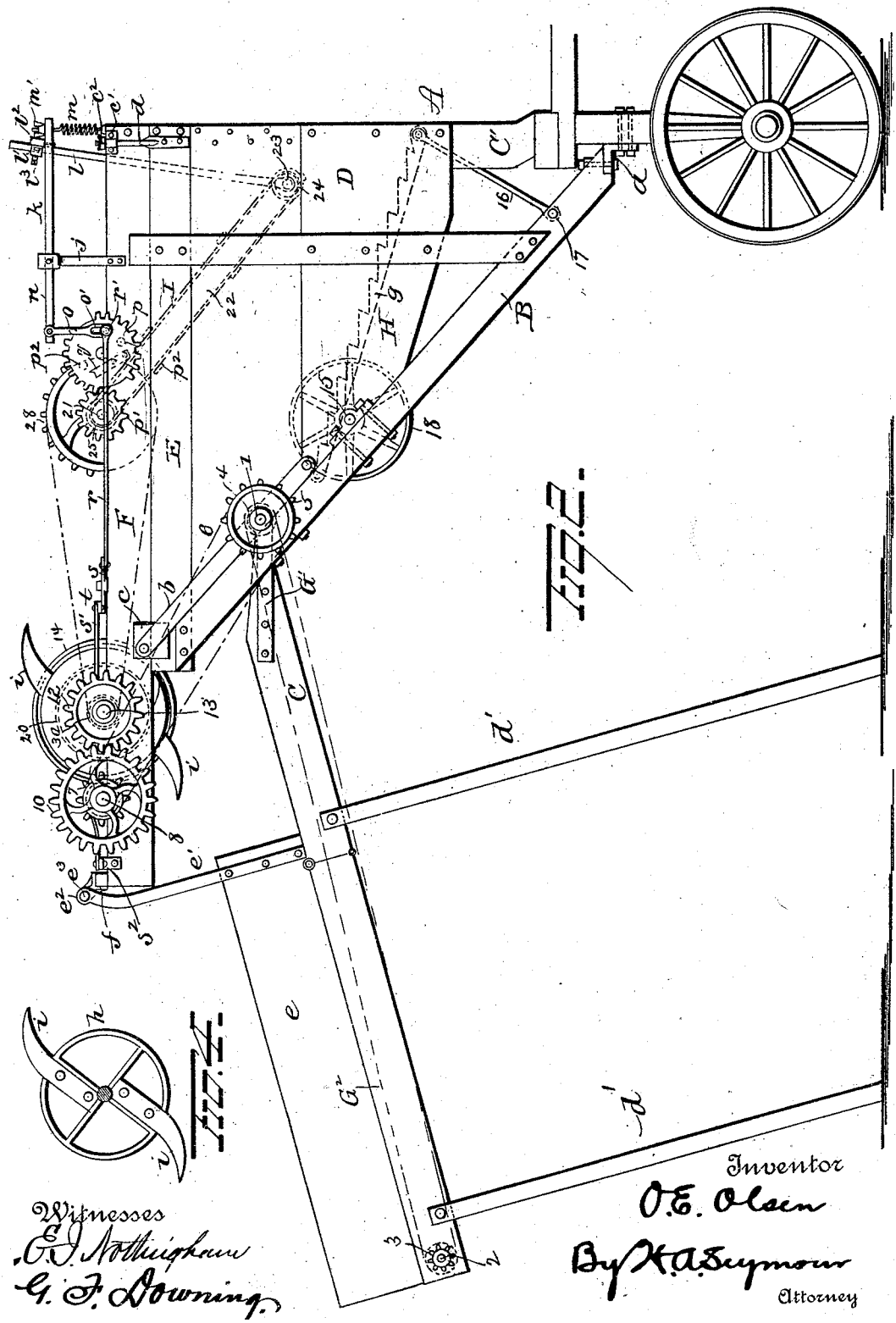
Witnesses
C. J. Nottingham
G. F. Downing
Inventor
O. E. Olsen
By H. A. Seymour
Attorney

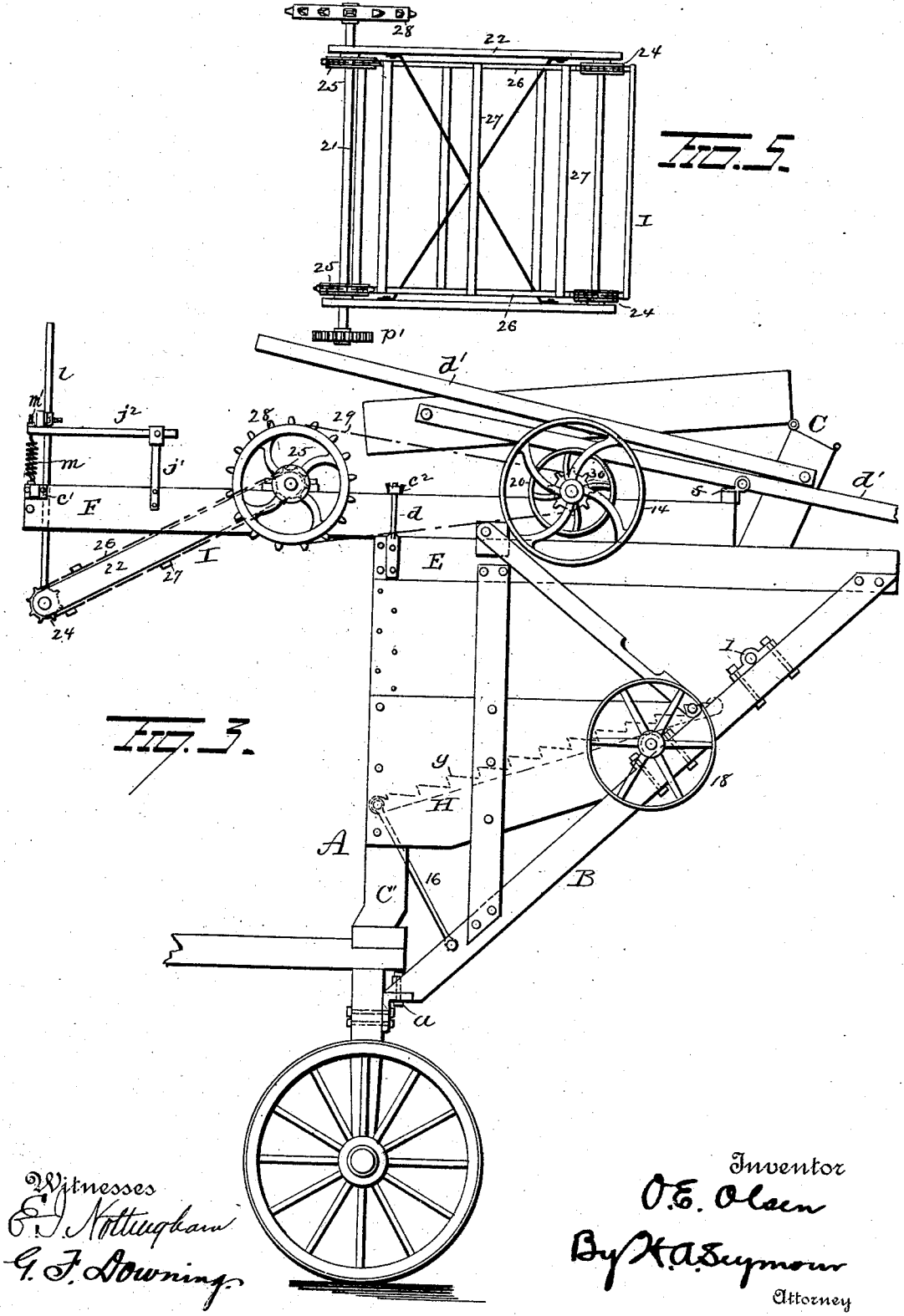

United States Patent Office.

OLE E. OLSEN, OF FREMONT, NEBRASKA.

BAND-CUTTER AND FEEDER.

SPECIFICATION forming part of Letters Patent No. 553,257, dated January 21, 1896.

Application filed September 24, 1894. Serial No. 523,959. (No model.)

*To all whom it may concern:*

Be it known that I, OLE E. OLSEN, a resident of Fremont, in the county of Dodge and State of Nebraska, have invented certain new and useful Improvements in Band-Cutters and Feeders; and I do hereby declare the following to be a full, clear, and exact description of the invention, such as will enable others skilled in the art to which it appertains to make and use the same.

My invention relates to an improvement in band-cutters and feeders for thrashing-machines, the object of the invention being to produce simple and efficient means for cutting the bands which bind bundles of grain and properly feeding the grain to the thrashing-cylinder.

With these objects in view the invention consists in certain novel features of construction and combinations and arrangements of parts, as hereinafter set forth and pointed out in the claims.

In the accompanying drawings, Figure 1 is a plan view of my improved apparatus with some of the parts removed. Fig. 2 is a side elevation showing the parts in their working positions. Fig. 3 is an elevation taken from the opposite side of the apparatus from Fig. 2 and showing the frame F moved forward and the carrier or feeder folded. Figs. 4 and 5 are detail views.

A represents a portion of a thrashing-machine, at the end thereof in which the cylinder and concave are located, and to the thrasher, brackets $a$ are secured for the reception of beams or braces B, which project upwardly and outwardly, and at their upper ends are secured to a horizontal frame C. Horizontal frame C is bolted to vertical bars C', which latter are also bolted to the braces B and to a feed-table jaw D, and said jaw is secured to the braces B.

Located on the frame C is a movable top frame F, connected with the braces B by means of bars $b$, pivoted at their respective ends to the frame F and braces B. The frame F is prevented from lateral motion by means of castings $c$, and in order to retain said frame F in its rear or operative position straps $d$ are secured to the frame C and provided at their upper ends with threaded shanks adapted to pass through loops or perforated brackets $c'$, secured to the frame F, and receive suitable thumb-nuts $c^2$. From this construction and arrangement of parts it will be seen that the frame F will be retained in its normal position, (shown in Fig. 2,) and that when the thumb-nuts $c^2$ are removed the frame F can be moved forward to the position shown in Fig. 2, when the apparatus is not in use, and the carrier folded thereon, as shown in Fig. 3.

A shaft 1 is mounted in suitable boxes secured to the braces or beams B, near the upper ends of the latter, and serves as a means for connecting a carrier-frame G to the apparatus, said carrier-frame being provided with straps or plates G' having openings or recesses for the reception of said shaft. The carrier-frame G is preferably made in two parts hinged together, each part being supported by means of legs $d'\,d'$. When the apparatus is not in use and the frame F is moved forward, the carrier-frame will be folded upon said frame F, as above mentioned.

Boards or gages $e$ are located in the carrier frame and adapted to be adjusted to the thickness of the bundles of grain to be operated upon. Each board or gage $e$ is provided with an arm $e'$, having an eye $e^2$ at its upper end. A rod or pipe $e^3$, secured to the cross-bar $f$ of the frame F, passes through the eyes $e^2$, so that the board or gage may be moved laterally and thus be adjusted to the size of the bundles of grain.

A shaft 2 is mounted in the free end of the carrier-frame G and carries two sprocket-wheels 3, over which the sprocket-chain of the carrier $G^2$ passes, said sprocket-chains also passing over and receiving motion from sprocket-wheels 4, carried by the shaft 1. The shaft 1 also carries a larger sprocket-wheel 5, to which motion is imparted by a sprocket-chain 6, the latter receiving its motion from a sprocket-wheel 7, mounted loosely on a short shaft 8, and the latter is mounted in suitable boxes on the top frame F. The hub of the sprocket-wheel 7 carries a portion of a clutch 9, the other portion of said clutch being carried by a gear-wheel 10, keyed to the short shaft 8, and the portions of said clutch are maintained normally in engagement with each other by means of a spring 11. Motion is imparted to the gear-wheel 10 by a pinion 12, carried by a shaft 13, mounted in the forward portion of the frame F. The other end of the shaft 13 is provided with a pulley 14, to which motion is imparted by a suitable belt from the shaft of the thrashing-cylinder.

The grain fed to the apparatus by the feeder or carrier $G^2$ will be deposited (after having had the bands cut, as hereinafter explained) on a feed-board H, located within the jaw D and communicating with the thrashing-cylinder. The feed-board H is provided with a series of notched cleats $g$, as shown in Figs. 2 and 3, and the outer end of said feed-board is connected to a crank-shaft 15, mounted in suitable boxes on the braces or beams B. The feed-board is disposed in an inclined position, and to its inner or lower end an arch or bracket 16 is pivotally connected, the ends of said arch or bracket being loosely connected to a rod or shaft 17, mounted in the braces or beams B. From this construction and arrangement of parts it will be seen that when the crank-shaft 15 is rotated the feed-board will be vibrated, so as to have a downward and inward motion, whereby to cause the grain deposited thereon to be fed to the thrashing-cylinder.

The crank-shaft 15 is provided with a band-wheel 18, to which motion is imparted by a band or belt 19, which latter receives its motion from a band-wheel 20, carried by the shaft 13.

A shaft 21 is mounted on the frame F at a point over the crank-shaft 15, and on this shaft the upper ends of a governor-frame 22 are pivotally mounted, said frame extending downwardly over the feed-board H, but at an angle thereto. In the lower end of the frame another shaft 23 is mounted, and carries two sprocket-wheels 24, over which the sprocket-chain of a governor I passes, said chains also passing over sprocket-wheels 25, carried by the shaft 21. The governor consists of the chains 26 and a series of bars 27, secured at their ends to the respective chains, producing in effect a sort of endless carrier. In order to impart motion to the governor I, one end of the shaft 21 is provided with a sprocket-wheel 28, to which motion is imparted by means of a sprocket-chain 29, said chain receiving its motion from a sprocket-wheel 30, carried by the shaft 13.

By inspection of Fig. 2 of the drawings it will be seen that when the apparatus is in operation the shaft 13 is disposed over the upper or inner end of the carrier or feeder $G^2$, and is therefore in a proper position to carry mechanism for cutting the bands on the bundles of grain. A series of disks $h$ are secured to the shaft 13, each disk being preferably made concave on one face, so as to throw most of the weight of the wheels or disks at the periphery thereof. The opposite face of each wheel or disk is recessed for the reception of the shanks of knives $i$, each disk being provided with two knives projecting therefrom in opposite directions. The knives $i$ are preferably made curved or hook-shaped, as shown in Fig. 2, so that they will clear the grain and not become entangled therewith. A series of guards J are secured at one end to the cross-bar $f$ of the frame F and extend between the knife-disks $h$ and beyond the knives $i$ carried thereby, so as to prevent the grain or straw from becoming wrapped about the shaft 13.

The grain being fed to the machine passes between the feed-board H and the governor I, and the flow of the grain to the thrashing-cylinder is controlled by the positions of these parts relatively to each other. It is desirable that the space between the feed-board and governor be regulated in accordance with the varying conditions of the grain and the thrashing apparatus, and therefore I propose to render the governor adjustable; and, again, it is desirable that means be provided for preventing the too rapid feeding of the grain to the thrashing devices. For the accomplishment of these objects the devices now to be explained will be employed.

A post or upright $j$ is secured to the top frame F and made with a bifurcated upper end for the reception of a lever $k$, which is pivoted, at a point between its ends, in said bifurcated post or upright. To the opposite bar of the frame F a post or upright $j'$ is secured, and to this post or upright an arm or lever $j^2$ is pivoted. Rods $l$ are pivoted at their lower ends to the lower or free end of the governor-frame, and at their upper ends pass through eyes or loops $l'$, carried by a cross-bar $l^2$, where they are adjustably held by means of set-screws $l^3$, the ends of said cross-bar being connected, respectively, with the lever $k$ and the pivoted arm $j^2$. By these means the governor can be raised or lowered and secured at any desired adjustment so as to regulate the flow of grain to the thrasher.

The rods $l$ having a connection with one end of the pivoted lever and pivoted arm, the free end of the governor can, of course, be made to move upwardly under an abnormal pressure of grain between said governor and the feed-board; but the upward movement of the governor will be retarded, unless the pressure against it is very great, by means of springs $m$ connected at their respective ends to the lever $k$ and arm $j^2$ and the frame F, said springs being connected with said lever and arm by means of set-screws $m'$, whereby their tension may be adjusted. The free end of the short arm $n$ of the lever $k$ is connected, by means of a pitman $o$, having an elongated slot $o'$, with a crank-pin $r'$ carried by a mutilated gear-wheel $p$ mounted on the frame F, said mutilated gear being adapted to mesh with a pinion $p'$ carried by the shaft 21 of the governor. The mutilated or regulator gear-wheel $p$ is provided on one face with pins $p^2$ at diametrically-opposite points, with which pins a spring $q$, secured to the frame F, is adapted to engage to prevent retrograde movement of said wheel.

A pitman $r$ is connected at one end with the crank-pin $r'$ on the mutilated or regulator gear-wheel $p$, and at the other end said pitman is connected with a bell-crank lever $s$ pivoted to the frame F. The other arm of the bell-crank lever is connected by means of a strap $t$ with one end of a lever $s'$, the other end of said lever being pivoted to a bar $s^2$ secured to the frame F. Between its ends the lever $s'$ is adapted to engage the clutch 9.

From the construction and arrangement of parts above described it will be seen that when the governor has been regulated or adjusted to permit a certain rate of flow of grain to the thrasher, and the flow becomes abnormal so as to clog the space between the governor and the feed-board, the free end of the governor will be raised by the pressure of the grain against it, and the lever $k$ made to turn on its pivot, causing the short arm of said lever to descend. This motion of the lever $k$ will cause the wheel $p$ to make a half-revolution through the medium of the pitman $o$ and pinion $p'$. As the wheel $p$ makes this half-revolution, the pitman $r$ will be moved longitudinally and caused to turn the bell-crank lever $s$ on its pivot, which motion will be imparted to the lever $s'$ through the strap $t$ and the lever $s'$ will move the clutch and throw the sprocket-wheel 7 out of gear, thus stopping the feeder or carrier $G^2$. The supply of grain will thus be automatically stopped; but the feed-board and governor will be still operating to feed the grain which has collected between them to the thrashing-cylinder. When the heavy flow of grain shall have been disposed of, and, in fact, while the accumulation of grain between the feed-board and governor is being diminished, the governor will move down by gravity and by the action of the springs $m$. As the free end of the governor moves down, the long arm of the lever $k$ will be lowered and the short arm raised, thereby causing the mutilated gear to mesh with the pinion $p'$ and make a half-revolution, stopping at the mutilated portion of said gear-wheel $p$. This movement of the wheel $p$ will cause a movement of the pitman $r$ and bell-crank lever $s$ reverse to that above described, and the strap $t$ being relaxed the spring 11 will operate the clutch 9 and the feeder or carrier $G^2$ will be again thrown into operation. Thus it will be seen that the grain will be fed accurately and regularly to the thrasher, and that when the devices which feed the grain to the thrashing-cylinder become clogged the carrier will be automatically stopped and retained at rest until the accumulation of grain shall have been disposed of, when the feeder will be automatically started.

My improvements are very simple in construction and effectual in all respects in the performance of their functions.

Slight changes might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. In a band cutter and feeder for thrashing machines, the combination with a carrier, and a feed board, of a governor constructed to cooperate with the feed board to move the straw forward, clutch mechanism for throwing the carrier in and out of motion, mutilated gear wheel and means extending from the latter to the clutch and to the free end of the governor, whereby the clutch is operated by the movement of the governor from its normal position, substantially as set forth.

2. In a band cutter and feeder for thrashing machines, the combination with a carrier, feed-board, a governor comprising a swinging frame and a traveling belt, a drive shaft for the said belt, and a pinion on said shaft, of a gear wheel adapted to be thrown into and out of mesh with the pinion, means connected with the governor for shifting said gear wheel whereby it is thrown into and out of mesh with the pinion, clutch mechanism and means extending from the gear wheel to the clutch mechanism for controlling the latter, substantially as set forth.

3. In a band cutter and feeder for thrashing machines, the combination with a carrier, a feed-board, and a governor comprising in the main a frame pivotally supported at one end, an endless belt which cooperates with the feed board to move the straw forward, of clutch mechanism for throwing the carrier in and out of motion, and means for adjustably connecting the said mechanism with the free end of the governor, substantially as set forth.

4. In a band cutter and feeder for thrashing machines, the combination with a carrier, and a feed board, of a governor supported on a shaft at one end and free to swing at the other end, a clutch mechanism for throwing the carrier in and out of motion, a pinion on the shaft, a mutilated gear wheel, a lever connected therewith, means extending from the mutilated gear wheel to the clutch mechanism, a rod extending from the free end of the governor to the lever and adjustably connected therewith, and means for returning the governor to its normal position, substantially as set forth.

5. In a band cutter and feeder, the combination with a carrier, rotary band cutters, a feed-board, a governor comprising a traveling endless belt, a shaft for driving said belt and supporting the governor, and gearing connecting the said carrier, band cutter, feeder, and governor whereby they are operated together, of a clutch, a pinion on the shaft of the governor, mutilated gear wheel, means for connecting said gear wheel with the clutch and the governor whereby the gear wheel and clutch are operated by any movement of the governor from its normal position, and means for returning the governor to its normal position, substantially as set forth.

6. In a feeding mechanism for thrashing machines, the combination with a feed board, of a governor located over the same, a lever, a cross bar connected to said lever and having an eye or loop thereon, a rod connected to said governor and passing through said loop and a set screw for securing the rod and loop whereby said governor can be secured at any desired adjustment to regulate the space between said governor and feed board, substantially as set forth.

7. In a feeding mechanism for thrashing machines, the combination with suitable framework and a feed board, of a governor adapted to operate over the feed board, means for operating the governor and feed board, a feeder or carrier adapted to deposit grain between the governor and feed board, gearing for driving said feeder or carrier, a clutch in said gearing, a pivoted lever, a rod connecting said pivoted lever with the governor, a mutilated gear connected with the other arm of said pivoted lever, a gear carried by the governor shaft and adapted to mesh with the mutilated gear, and devices connecting said mutilated gear with said clutch, whereby when the free end of the governor rises the clutch will be operated to stop the feeder or carrier and whereby when the free end of the governor moves down the clutch will be operated to operate the clutch to start said feeder or governor, substantially as set forth.

8. In a feeding mechanism for a thrasher, the combination with a frame, of a movable top frame mounted on said first-mentioned frame, a governor and cutting mechanism carried by said movable frame, means for retaining said movable frame in operative position, and a feeder or carrier adapted to be folded over said movable frame, substantially as set forth.

9. In a feeding mechanism for a thrasher, the combination with a stationary frame, of a movable frame mounted thereon, bars pivotally connected to said stationary and movable frames respectively, a governor and cutting mechanism carried by said movable frame, a feeder or carrier connected with the stationary frame and adapted to be folded over the movable frame, castings to prevent lateral movement of the movable frame, and straps for retaining the movable frame fixed in operative position, substantially as set forth.

10. In a feeding mechanism for a thrasher, the combination with a framework, and a feeder or carrier, of a shaft, a pinion carried by said shaft, a short shaft, a gear wheel carried by said short shaft and meshing with said pinion, a sprocket wheel mounted on the short shaft, a clutch for locking said sprocket wheel to the gear wheel, a sprocket wheel carried by the shaft of the feeder or carrier, a chain passing over said sprocket wheels, a governor and means controlled by the governor for controlling the operation of said clutch, substantially as and for the purpose set forth.

11. In a band cutter and feeder, the combination with a frame, and a feeder or carrier, of a shaft mounted over the feeder or carrier, a series of disks secured to said shaft, knives secured to said disks and adapted to cut the bands of bundles of grain passing over said feeder or carrier, a feed board, and a traveling belt governor, said feed board, governor and feeder or carrier being so arranged that grain will be received from the feeder or carrier between the governor and feed board and fed thereby to the thrashing machine, substantially as set forth.

In testimony whereof I have signed this specification in the presence of two subscribing witnesses.

OLE E. OLSEN.

Witnesses:
C. A. SIGAFOOS,
J. E. FRICK.